United States Patent [19]

Franzon et al.

[11] 4,258,811
[45] Mar. 31, 1981

[54] ELECTRIC MASS AND FORCE MEASURING APPARATUS

[75] Inventors: Hans Å. Franzon; Jan K. Gustafsson; Per-Erik Nilsson, all of Karlskoga, Sweden

[73] Assignee: AB Bofors, Bofors, Sweden

[21] Appl. No.: 733,821

[22] Filed: Oct. 19, 1976

[30] Foreign Application Priority Data

Sept. 29, 1975 [CH] Switzerland .................. 12078/75

[51] Int. Cl.$^2$ .................. G01G 19/00; G01G 21/24
[52] U.S. Cl. .................. 177/200; 177/255
[58] Field of Search .................. 177/200, 210 FP, 255

[56] References Cited

U.S. PATENT DOCUMENTS

| 2,767,974 | 10/1956 | Ballard et al. | 177/200 UX |
| 2,767,975 | 10/1956 | Horst et al. | 177/200 |
| 2,802,660 | 8/1957 | Williams, Jr. | 177/255 |
| 3,322,222 | 5/1967 | Baur | 177/210 FP |
| 3,565,193 | 2/1971 | Wirth | 177/210 FP |
| 3,612,198 | 10/1971 | Gallo | 177/210 FP |
| 3,621,713 | 11/1971 | Wirth et al. | 177/210 FP X |
| 3,847,238 | 11/1974 | Hall et al. | 177/255 |
| 4,010,638 | 3/1977 | Gallo | 177/210 FP X |

Primary Examiner—George H. Miller, Jr.
Attorney, Agent, or Firm—Pollock, Vande Sande & Priddy

[57] ABSTRACT

Electric mass and force measuring apparatus which includes two force transducers, one of which provides an electrical output signal which is proportional to the gravitational force acting on the mass to be determined, and the other providing an electrical output signal which is proportional to the gravitational force of a known mass. A signal processor responds to both of the electrical output signals and provides an output signal which represents the unknown mass. The force transducers are of the type which respond only to a force component acting in a predetermined direction, and are supported in a common frame in a manner which insures that the predetermined directions of the transducers are parallel to each other. The force transducers are preferably of the beam type and include a beam which is freely deflectable at one end and rigidly secured to another beam which extends freely to the side of the first-mentioned beam, while also being shorter than such first-mentioned beam. The unknown mass is supported upon a weighing platform, and the first-mentioned beam of the first force transducer which is responsive to the mass to be determined is fixedly attached to the frame, while the second-mentioned beam of that same transducer is connected via a shaft to the weighing platform.

2 Claims, 8 Drawing Figures

A-A

B-B

ELECTRIC MASS AND FORCE MEASURING APPARATUS

BACKGROUND OF THE INVENTION

The present invention relates to an improved electric mass and force measuring apparatus of the type including a first force transducer for providing an electrical output signal proportional to the gravitational force of the mass to be determined, a second force transducer for providing an electrical output signal proportional to the gravitational force of a known mass, and signal processing means for calculating and indicating the measure of the unknown mass.

When measuring physical quantities, for example forces, it has long been known to use measuring devices which convert the physical quantity to an electric signal. The signal is then processed in any appropriate way so that the measurement test result can be registered or visually displayed in processing means. In weighing equipment, force transducers, load cells or similar transducers are often used as measuring devices in order to achieve an analog voltage or signal proportional to the gravitational force of the unknown mass. The analog signal is amplified and fed to an analog-to-digital converter for producing a digital output signal corresponding to the mass of the load.

It is often difficult to attain acceptable accuracy in weighing equipments of the above-mentioned type, especially when weighing on ships. In order to achieve a true measuring result, it is necessary that the measuring direction of the force transducer coincide with the vertical. When measuring on a firm support, it is certainly possible to compensate for tilting, but on ships equipped with means for weighing articles at sea, it has not been possible on account of the movement of the ship when the sea is high. As a result, in some circumstances, it has been necessary to accept an error of as much as 10 percent of the measuring result.

It is not only the variations of a tilting support that has a negative effect on the measuring result when weighing at sea. Also variations of the vertical acceleration due to movement of the ship up and down vertically, for instance when pitching, result in a misleading measuring result.

OBJECTS OF THE INVENTION

The object of the present invention is therefore to provide a mass and force measuring apparatus, the accuracy of which is unaffected by the movements of the support. Primarily, both of the force transducers are provided with very accurately defined measuring directions and so arranged that their measuring directions are parallel to each other and that the signal processing means is arranged to form the ratio between the two measuring signals provided by the force transducers.

BRIEF DESCRIPTION OF THE DRAWING

A specific embodiment of the invention will now be described, by way of example, with reference to the accompanying drawings, in which FIG. 1 schematically illustrates the main components of the invention.

DETAILED DESCRIPTION OF THE PREFERRED EMBODIMENT

Figure 1:
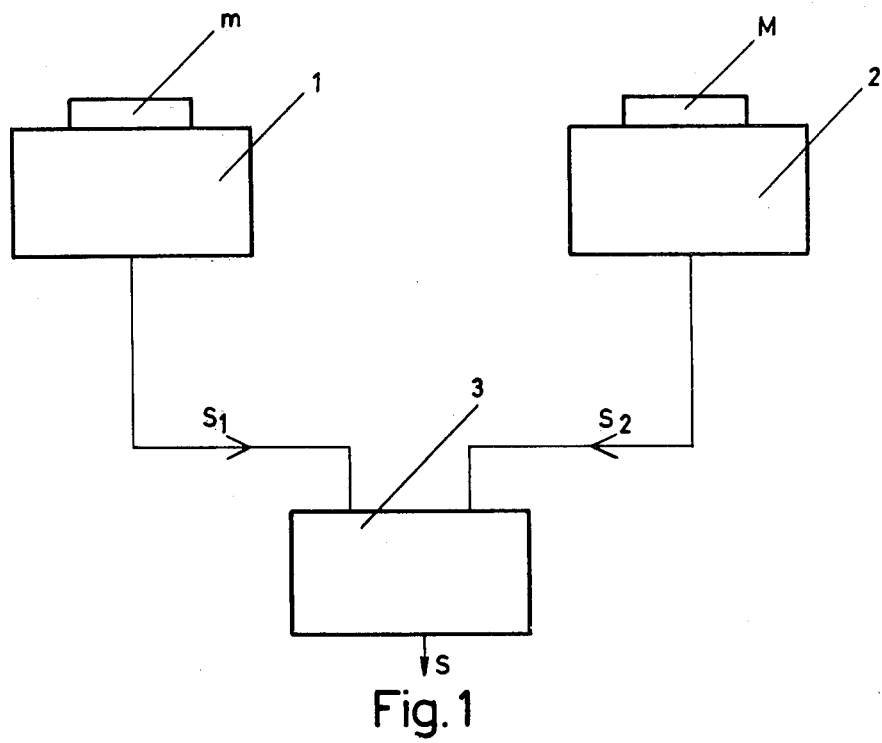

FIG. 1 shows schematically the main components of a mass and force measuring apparatus according to the invention. The apparatus comprises a first force transducer 1, providing an analog output signal $S_1$, which is proportional to the gravitational force of the mass m to be determined. The device also comprises a second force transducer 2, which also provides an analog output signal $S_2$, which is proportional to the gravitational force of a reference mass M. The two signals $S_1$ and $S_2$ are fed to the signal processing means 3 which is arranged to form the ratio between the two signals $S_1$ and $S_2$. The ratio is then registered in any appropriate way or visually displayed.

Figure 2:
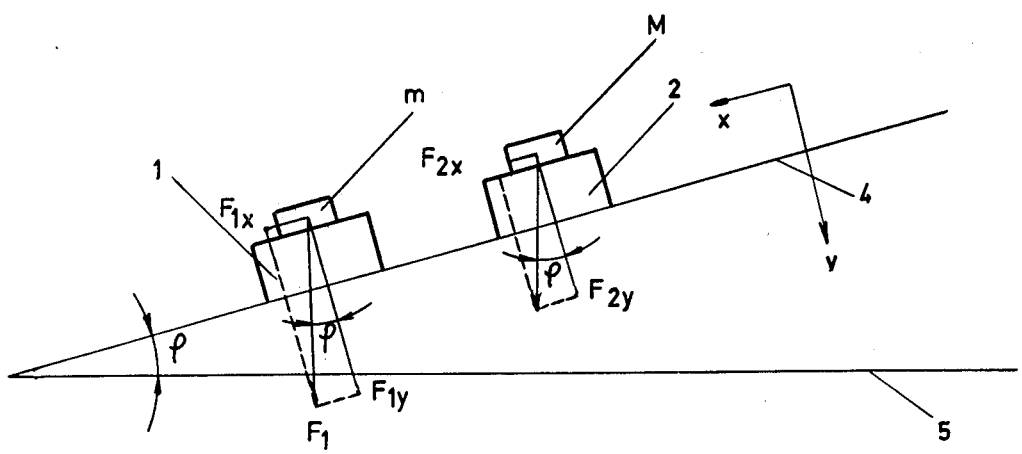
FIG. 2 illustrates the force situation of a tilting support for the force transducers.

FIG. 2 illustrates the actual situation when the measuring directions of the force transducers are not parallel with the vertical line, i.e. when the force transducers are located on a tilting support. The two force transducers may, by way of example, be of the type described in the Swedish patent specification No. 311 573, which comprises a first beam freely deflectable at one end and rigidly secured with a second beam, which beam extends freely to the side of the first beam and is shorter than this beam. The first beam is provided with strain gage means which sense deformations in the material in the first beam caused by shearing stresses and bending stresses. Said force transducers are known per se and will therefore not be described here in detail. It is a characteristic of transducers of this kind that they are able to mechanically withstand heavy transverse forces and that they provide an output signal which is independent of such transverse forces. The measuring direction for such a force transducer will then coincide with the y-direction in FIG. 2. As the support 4 of the force transducers forms an angle $\phi$ with the horizontal plane 5, the measuring direction will be deflected from the vertical line with an angle $\phi$.

The two force transducers are affected by a gravitational force $F_1 = m \cdot g(t)$, caused by the unknown mass, and $F_2 = M \cdot g(t)$, caused by the reference mass, which mass is previously known. The expression g(t) is composed partly by the gravitational acceleration and partly by a positive or negative acceleration component due to movement of the support, resulting, for instance, from vibrations, and which component varies as a function of time.

The two forces $F_1$ and $F_2$ can be divided into one component in the x-direction and one component in the y-direction, which may be expressed for the y-direction:

$$F_{1y} = m \cdot g(t) \cdot \cos \phi(t)$$ and $$F_{2y} = M \cdot g(t) \cdot \cos \phi(t),$$

respectively.

As force transducers of the type now described are insensitive to transverse forces and bending moments, the output signals from the transducers will be affected only by the forces $F_{1y}$ and $F_{2y}$, respectively, which forces act in the measuring direction of the transducers. Influenced by these forces, the transducers provide analog output signals $S_1$ and $S_2$ being a measure of the forces $F_{1y}$ and $F_{2y}$, respectively. On account of the time-dependent expression $g(t) \cdot \cos\phi(t)$, however, the output signals are not a measure of the true gravitational force of the respective mass. In the processing means 3, a signal S is formed, which is the ratio between the two output signals $S_1$ and $S_2$. Due to the fact that both of the force transducers are arranged to have their measuring directions parallel, the time-dependent expression is eliminated, which gives $$S = \frac{S_1}{S_2} \sim \frac{m}{M}$$

As the reference mass M is previously known, the signal S is a measure of the unknown mass m which is independent of the angle $\phi$ and time t.

Figure 3A:
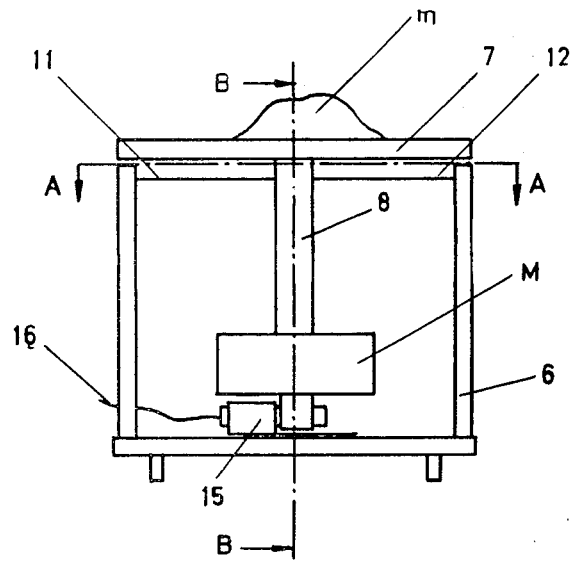
FIGS. 3a-3c illustrates a suitable mechanical arrangement of the measuring apparatus and FIGS. 4, 5 and 6 illustrate block schematic circuit diagrams of the invention.

FIGS. 3a, b and c illustrate a suitable embodiment of the invention in the form of a weighing device with a fixed frame 6 and a weighing platform 7, which is movable relative to the frame and on which the load, the mass of which is going to be determined, can be placed. The load is transmitted via a shaft 8 to a first force transducer 9 firmly attached to the frame 6 and the measuring information of the transducer is fed to a signal processing means via a connection cable 10. In order to stabilize the weighing platform 7 laterally relative to the frame 6, the shaft 8 is vertically guided by means of four diagonally suspended membranes 11–14, and the force transducer 9. The weighing device also comprises a second force transducer 15 for carrying a reference mass M, and which is firmly attached to the frame 6. The measuring information from this force transducer is transmitted to the signal processing means via a connection cable 16. Both of the force transducers which are of the above-mentioned beam type, are arranged in such a way that one end of the beam subjected to bending is firmly secured in the bottom part of the frame, while the other end of said beam is freely deflectable and via the other beam adapted to serve as a point of application for the force to be measured. Both of the force transducers are then fixedly oriented to each other and their measuring directions are parallel, independent of the movement of the support.

Figure 4:
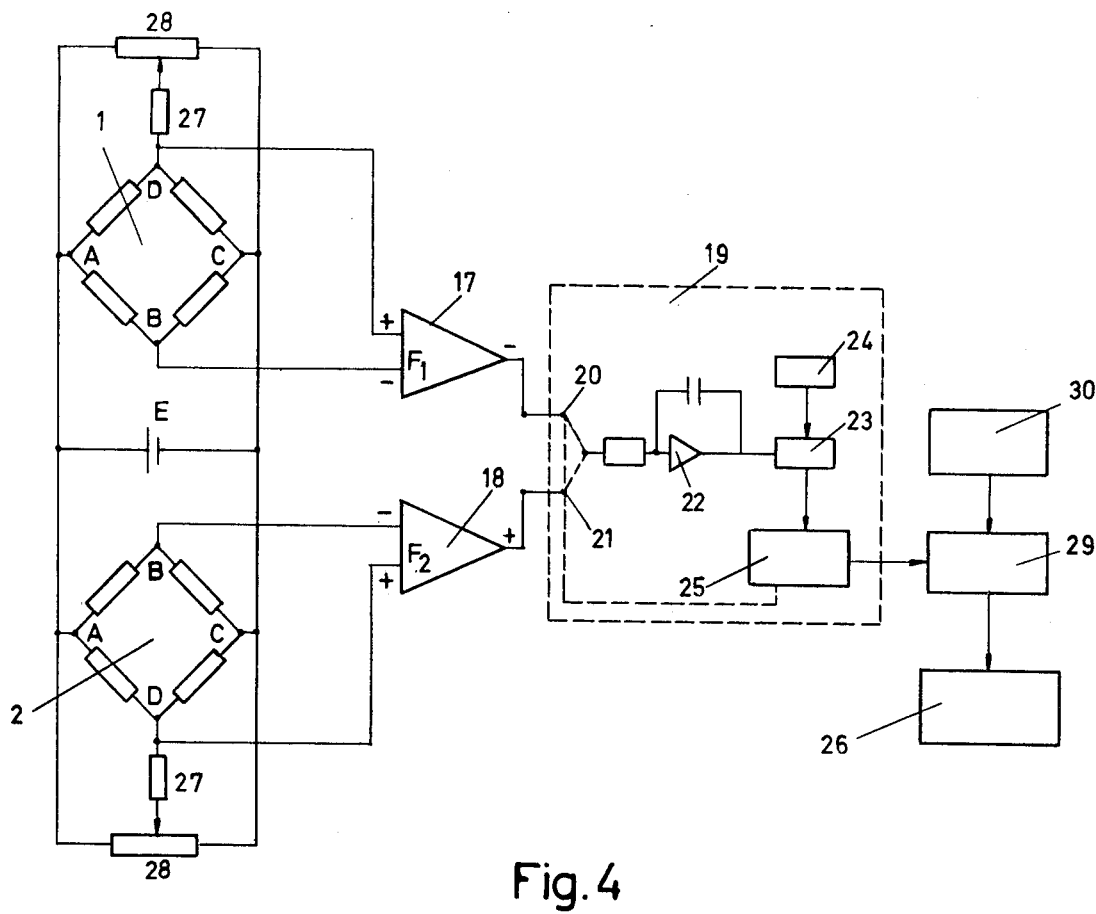

Preferably the signal processing means 3 consists of a conventional analog-to-digital converter, for example a converter of the dual integrating type, described in Swedish Pat. No. 352 504. FIG. 4 shows, by means of a block diagram, how the measuring information from the two force transducers is fed to the analog-to-digital converter.

Each of the force transducers 1 and 2 comprises four strain gages of which two are affected by a positive tension and the two others by negative tension. The four strain gages are in a known manner connected in the four branches of a conventional electrical Wheatstonebridge, which is connected to an outer voltage supply E. Unbalance of the bridge gives rise to an analog output signal from the force transducers in question which signal is amplified in an amplifier 17 and 18, respectively, and fed to the analog-to-digital converter 19. The output signal from the force transducer measuring the gravitational force of the unknown mass m is then fed to the signal input terminal 20 of the analog-to-digital converter, while the output signal from the force transducer measuring the gravitational force of the reference mass M is fed to the reference voltage input terminal 21 of the analog-to-digital converter. The analog-to-digital converter includes an integrator 22 that integrates the two input signals whereby the signal on the reference input terminal has a polarity opposite that of the signal on the signal input terminal of the analog-to-digital converter. The integrated signal is transmitted to one of the inputs of an AND-gate 23, the second input of which is connected to a clock pulse generator 24, whereby pulses are transmitted to a counter 25. The switching between the signal on the input terminal 20 and the signal on the reference input terminal 21 is affected in accordance with said Swedish Patent specification No. 352 504. The number of pulses that have been registered by the counter then represent the relation between the input signals on the input terminals 20 and 21, which gives for the number N of counts:

$$N = \frac{E \cdot m \cdot k_1 \cdot g(t) \cos \phi(t) \cdot F_1}{E \cdot M \cdot k_2 \cdot g(t) \cos \phi(t) \cdot F_2}$$

in which $k_1$ and $k_2$ are the transmitting constants for the force transducer 1 and 2, respectively and $F_1$ and $F_2$ the gain of the amplifier 17 and 18, respectively. The expression can be put in a more simple form:

$$N = \frac{m}{M} \cdot \frac{k_1 F_1}{k_2 F_2}$$

By adjusting the gain $F_1$ and $F_2$ into suitable values, the scaling factor may easily be set in such a way that N represents the mass m directly in the measuring unit, for instance kg.

Thus, the number of uounts provided by said counter is proportional to the unknown mass m and can be stored in a register for visual indication on a digital read-out unit 26. By forming the ratio between the signals, the result will be independent of variations in the supply voltage E.

In order to otain a true value when the ratio is formed, it is necessary that the electrical output signal from the force transducer equals zero when the force transducer is unloaded. In order to ensure this, each of the force transducers includes a balance circuit comprising a resistor 27 and a potentiometer 28 connected to the resistance bridge as shown in FIG. 4.

By means of the potentiometer 28, the output signal from the force transducer can be adjusted so that it equals zero when it is unloaded.

Figure 3B:
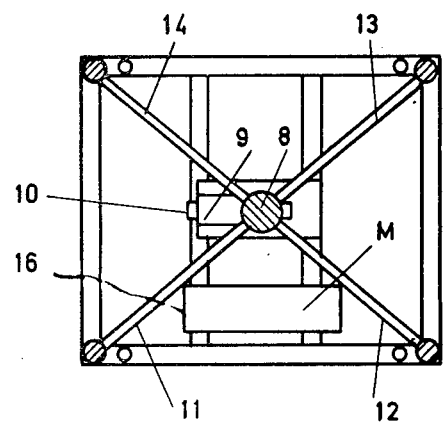
Figure 3C:
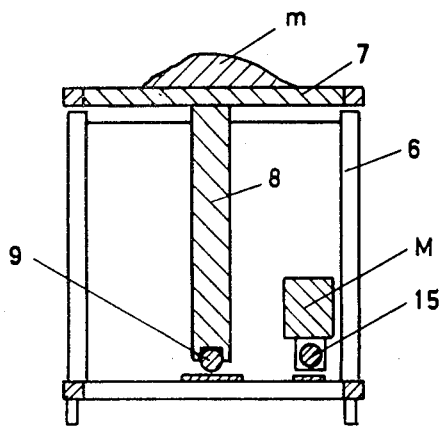

If the weighing 3equipment includes a tare load $M_T$, for instance the weight of the weighing platform 7 in FIG. 3, then the device can be provided with taring means. The taring operation may be effected in two ways, either as digital taring or analog taring. FIG. 4 shows an example of digital taring whereby the signal processing means 3 also includes a subtraction circuit 29 which digitally subtracts the tare weight from the number of counts on the output terminal of the analog-to-digital converter. The subtraction circuit is then affected by signals from a tare circuit 30, which corresponds to the tare load on the force transducer. The tare circuit can be set automatically or by hand and can even be disconnected.

Figure 5:
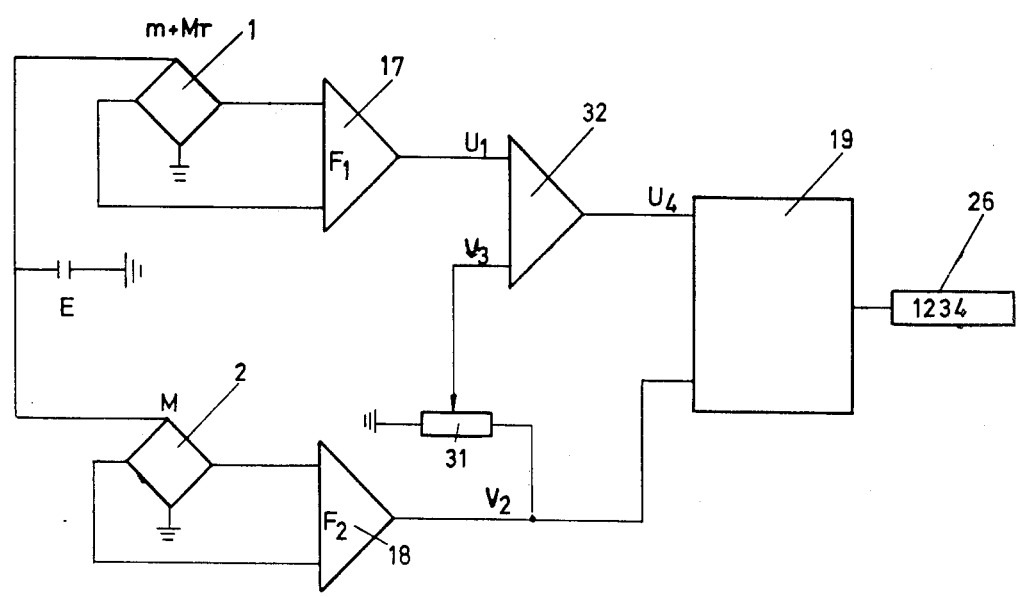

FIG. 5 illustrates, by way of example, how the analog taring may be effected. In this case, the taring is effected before the ratio is formed by means of a taring circuit including a voltage divider in form of a potentiometer 31, which is connected between the output terminal of the amplifier 18 and one of the input terminals of a third amplifier 32, to the second input terminal of which the amplified output signal from the first force transducer is fed. The rest of the circuit is composed in the same way as the circuit according to FIG. 4.

The amplifier 32 provides an output signal $U_4$, which is proportional to the difference between $U_1$ and $U_3$, where $U_3$ is the part of the signal $U_2$, which is set by the potentiometer 31.

By adjusting the potentiometer so that $U_3$ equals the part of the signal $U_1$, which corresponds to the tare weight $M_T$, then this will be eliminated. Practicably the adjustment is effected so that the potentiometer is turned until the numeral displayed equals 0000 when the weighing device is unloaded, i.e. when m=0.

Figure 6:
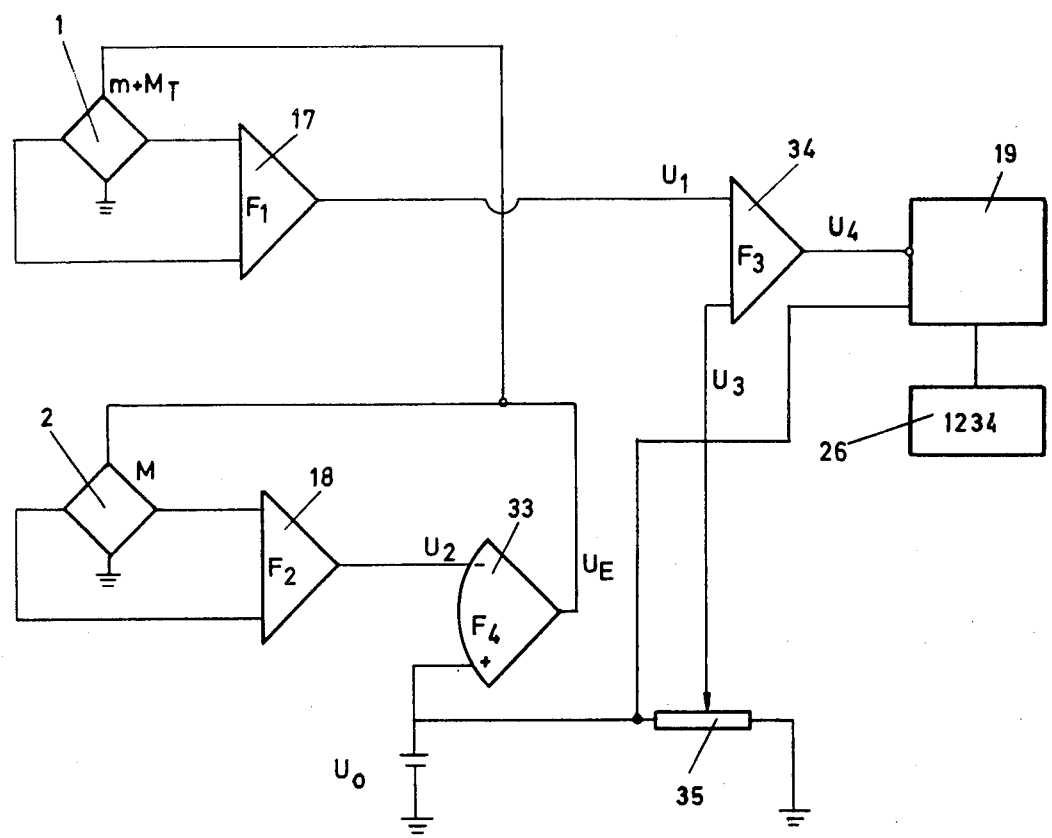

FIG. 6 shows an embodiment of the invention in which the forming of the ratio is effected by means of analog signal processing. In accordance with the embodiments which have now been described, m designates the mass which is to be measured, M the reference mass and $M_T$ the tare mass. The output signals from the two force transducers 1 and 2 are amplified in one amplifier 17 and 18 each, with the gain $F_1$ and $F_2$, respectively. The output signal $U_2$ from the amplifier 18 is fed to the negative input terminal of an operational amplifier 33, whose other positive input terminal is connected to the reference voltage supply $U_0$. The output terminal of the operational amplifier is fed back to the resistance bridge 2 as well as to the resistance bridge 1. The output signal $U_1$, from the amplifier 17 is fed to one of the input terminals of another amplifier 34 with the gain $F_3$, whose other input terminal is connected to a tare circuit 35. The different signals in the circuit diagram may be expressed as:

$$U_1 = (m+M_T) \cdot k_1 \cdot F_1 \cdot g(t) \cos\phi(t) \cdot U_E$$

$$U_2 = M \cdot k_2 F_2 \cdot g(t) \cos\phi(t) \cdot U_E$$

$U_2$ is approximately equal to $U_0$
because of the high amplification in the operational amplifier 33, which in the present case works in quite a conventional way, i.e. the output signal $U_E$ will become such a level that the difference signal $U_2-U_0$ on the input terminal of the amplifier is visually equal to zero.
If $U_E$ and $U_2$ are eliminated from these equations, then $$U_1 = U_0 \frac{(m+M_T)}{M} \cdot \frac{k_1 F_1}{k_2 F_2}$$

i.e. the time dependent factor $g(t) \cos\phi(t)$ is eliminated and the output signal $U_1$ is directly proportional to the ratio between the masses.

The part of the signal $U_1$ that corresponds to the tare mass $M_T$, is eliminated by the potentiometer 35. From this a signal $U_3$ is obtained, which signal is subtracted from $U_1$, in the amplifier 34.

The potentiometer 35 is so adjusted that the readout unit 26 indicates zero for an unloaded weighing device, i.e. m=0.

The signal $U_4$ will then be proportional to the unknown mass m, i.e.:

$$U_4 = U_0 \cdot \frac{m}{M} \cdot \frac{k_1 F_1}{k_2 F_2}$$

$U_0$ is used as a reference for the analog-to-digital converter 19, and the indication will then be proportional to the ratio $U_4/U_0$, i.e. proportional to m.

The invention is not limited to the embodiments shown above as examples, but can be subjected to modifications within the scope of the following claims.

We claim:

1. In an electric mass and force measuring apparatus having a first force transducer for providing an electrical output signal proportional to the gravitational force of the mass to be determined, a second force transducer for providing an electrical output signal proportional to the gravitational force of a known mass, and signal processing means for calculating and providing an output manifestation representative of the unknown mass, the improvement comprising:

means for each of said force transducers to cause the associated transducer to respond only to a force component acting in a predetermined direction;

means including a common frame for fixedly supporting said force transducers in a manner to ensure that said predetermined directions of said transducers are parallel to each other;

each of said force transducers being of the beam type and including a first beam which is freely deflectable at one end thereof and rigidly secured to a second beam, said second beam extending freely to the side of said first beam and being shorter than said first beam;

a weighing platform for supporting the unknown mass;

said first beam of said first force transducer being fixedly attached to said frame, said second beam of said first force transducer being connected via a shaft to said weighing platform.

2. Apparatus according to claim 1, characterized in that the first beam of said second force transducer is fixedly attached to said frame while its second beam is responsive to the known mass.

* * * * *

UNITED STATES PATENT AND TRADEMARK OFFICE
CERTIFICATE OF CORRECTION

PATENT NO. : 4,258,811
DATED : March 31, 1981
INVENTOR(S) : HANS A. FRANZON; JAN K. GUSTAFSSON; and PER-ERIK NILSSON It is certified that error appears in the above-identified patent and that said Letters Patent are hereby corrected as shown below:

[30] Foreign Application Priority Data

"Sept. 29, 1975 [CH] Switzerland....................12078/75"

should read

--Oct. 29, 1975 [SE] Sweden......................12078/75 --;

Signed and Sealed this

Seventh Day of July 1981

[SEAL]

Attest:

RENE D. TEGTMEYER

Attesting Officer     Acting Commissioner of Patents and Trademarks